(12) United States Patent
Jaranson et al.

(10) Patent No.: US 11,168,856 B2
(45) Date of Patent: Nov. 9, 2021

(54) CUSTOMIZABLE VEHICLE EXTERIOR LAMPS

(71) Applicant: FORD GLOBAL TECHNOLOGIES, LLC, Dearborn, MI (US)

(72) Inventors: John Wayne Jaranson, Dearborn, MI (US); Harvey Krage, Ypsilanti, MI (US); Richard H. Wykoff, Commerce Township, MI (US); Barry K. Loucks, Grosse Pointe Park, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/834,381

(22) Filed: Mar. 30, 2020

(65) Prior Publication Data

US 2021/0301992 A1  Sep. 30, 2021

(51) Int. Cl.
*F21S 41/19* (2018.01)
*F21S 41/25* (2018.01)
(Continued)

(52) U.S. Cl.
CPC ............ *F21S 41/19* (2018.01); *B60Q 1/0483* (2013.01); *F21S 41/25* (2018.01); *F21V 17/002* (2013.01);
(Continued)

(58) Field of Classification Search
CPC .. F21S 41/19; F21S 41/25; F21S 41/50; F21S 41/55; F21S 43/50; F21S 43/51; B60Q 1/0483; B60Q 2900/10; F21W 2104/00; F21W 2103/20; F21W 2103/35; G09F 21/04; G09F 21/048; G09F 2013/1845; G09F 13/044; F21V 17/002
(Continued)

(56) References Cited

U.S. PATENT DOCUMENTS

| 973,726 | A | * | 10/1910 | Tingley | ................... | F21S 41/36 362/517 |
| 1,065,444 | A | * | 6/1913 | Greenberg | .............. | G09F 13/06 40/206 |

(Continued)

FOREIGN PATENT DOCUMENTS

| CA | 2115790 | A1 | * | 8/1995 | ............... | B60Q 1/44 |
| DE | 202019000381 | U1 | | 2/2019 | | |

OTHER PUBLICATIONS

Optronics' custom LED lighting features GloLight branding | Trailer Body Buildings, 5 pages, https://www.trailer-bodybuilders.com/equipment-parts/article/21744408/optronicustom-l ..., uploaded Feb. 7, 2020.

*Primary Examiner* — Alan B Cariaso
(74) *Attorney, Agent, or Firm* — David Coppiellie; Carlson, Gaskey & Olds

(57) ABSTRACT

This disclosure relates to vehicle exterior lighting systems that include lamp assemblies that may be customized for meeting customer styling preferences. Exemplary lamp assemblies may include a lamp housing, a removable insert mounted to an interior wall of the lamp housing, and an access panel mounted to the rear exterior surface. The access panel is removable from the rear exterior surface to expose an access opening for inserting or removing the removable insert. The removable insert may include one or more customized features for personalizing the lamp assemblies.

20 Claims, 7 Drawing Sheets

(51) Int. Cl.
*B60Q 1/04* (2006.01)
*G09F 21/04* (2006.01)
*F21V 17/00* (2006.01)
*G09F 13/04* (2006.01)
*F21W 104/00* (2018.01)
*F21W 103/20* (2018.01)
*G09F 13/18* (2006.01)

(52) U.S. Cl.
CPC .......... *G09F 13/044* (2021.05); *G09F 21/048* (2013.01); *B60Q 2900/10* (2013.01); *F21W 2103/20* (2018.01); *F21W 2104/00* (2018.01); *G09F 2013/1845* (2013.01)

(58) Field of Classification Search
USPC ............................................ 362/485; 40/556
See application file for complete search history.

(56) References Cited

U.S. PATENT DOCUMENTS

| | | | | |
|---|---|---|---|---|
| 1,629,231 A * | 5/1927 | Stover | ...................... | B60Q 1/44 40/573 |
| 1,651,070 A * | 11/1927 | Ring | ........................ | B60Q 1/14 40/556 |
| 4,977,695 A * | 12/1990 | Armbruster | .......... | B60R 13/005 40/541 |
| 5,119,278 A * | 6/1992 | Watson | .................. | B60Q 1/503 340/470 |
| 5,700,079 A * | 12/1997 | Woerner | ................ | B60Q 1/007 362/496 |
| 6,164,804 A * | 12/2000 | Self | .......................... | B60Q 1/30 362/485 |
| 7,535,343 B1 * | 5/2009 | Pinckney | ................ | B60R 13/00 340/425.5 |
| 7,942,542 B1 * | 5/2011 | Dunn | ...................... | G09F 13/16 362/97.3 |
| 8,939,621 B2 * | 1/2015 | Brown | ..................... | B60Q 1/56 362/507 |
| 10,124,717 B2 | 11/2018 | Bachtrop et al. | | |
| 10,323,813 B2 | 6/2019 | Hontz | | |
| 2005/0052881 A1 * | 3/2005 | Hamada | ............... | B60Q 1/2607 362/540 |
| 2006/0290158 A1 * | 12/2006 | Cullison | ................ | G09F 13/08 296/57.1 |
| 2007/0234612 A1 * | 10/2007 | Corbishley | ........... | G09F 21/048 40/591 |
| 2012/0224259 A1 * | 9/2012 | Choi | ........................ | G09F 19/14 359/463 |
| 2012/0256543 A1 * | 10/2012 | Marcove | ............... | B60R 13/005 315/77 |
| 2015/0075042 A1 * | 3/2015 | Ebensteiner | ............ | B60Q 1/50 40/204 |
| 2017/0297480 A1 * | 10/2017 | Elwell | .................... | F21S 45/47 |

\* cited by examiner

CUSTOMIZABLE VEHICLE EXTERIOR LAMPS

TECHNICAL FIELD

This disclosure relates to vehicle exterior lighting systems, and more particularly to customizable exterior lamp assemblies for vehicle exterior lighting systems.

BACKGROUND

Vehicle exterior lighting systems include a multitude of lighting and signaling devices for illuminating the vehicle and alerting others of the vehicle's presence and driving intentions. These lighting systems typically include lamp assemblies positioned at both the front and the rear of the vehicle.

SUMMARY

A vehicle lamp assembly according to an exemplary aspect of the present disclosure includes, among other things, a lamp housing including a front exterior surface and a rear exterior surface, a removable insert mounted at an interior wall of the lamp housing, and an access panel mounted to the rear exterior surface. The access panel is removable from the rear exterior surface to expose an access opening for accessing the removable insert.

In a further non-limiting embodiment of the foregoing vehicle lamp assembly, the vehicle lamp assembly is a head lamp assembly or a tail lamp assembly.

In a further non-limiting embodiment of either of the foregoing vehicle lamp assemblies, a lens is supported by the lamp housing.

In a further non-limiting embodiment of any of the foregoing vehicle lamp assemblies, a first light source is configured to illuminate portions of the lamp housing.

In a further non-limiting embodiment of any of the foregoing vehicle lamp assemblies, a second light source is configured to illuminate the removable insert.

In a further non-limiting embodiment of any of the foregoing vehicle lamp assemblies, the second light source is mounted to the interior wall and is configured to backlight a customized feature of the removable insert.

In a further non-limiting embodiment of any of the foregoing vehicle lamp assemblies, the removable insert includes a customized feature.

In a further non-limiting embodiment of any of the foregoing vehicle lamp assemblies, the customized feature includes a brand name, initials, a logo or symbol, or a phrase.

In a further non-limiting embodiment of any of the foregoing vehicle lamp assemblies, the removable insert is viewable through a window formed in the front exterior surface.

In a further non-limiting embodiment of any of the foregoing vehicle lamp assemblies, the removable insert is clipped or fastened to the interior wall.

In a further non-limiting embodiment of any of the foregoing vehicle lamp assemblies, the access panel is mounted to the rear exterior surface by at least one screw.

In a further non-limiting embodiment of any of the foregoing vehicle lamp assemblies, the access panel is received within the access opening in an interference fit.

In a further non-limiting embodiment of any of the foregoing vehicle lamp assemblies, an interface between the access panel and the access opening is sealed via a gasket seal or a grommet.

In a further non-limiting embodiment of any of the foregoing vehicle lamp assemblies, the removable insert is secured to a side facing portion of the front exterior surface.

In a further non-limiting embodiment of any of the foregoing vehicle lamp assemblies, the vehicle lamp assembly is part of a motor vehicle.

A method according to another exemplary aspect of the present disclosure includes, among other things, securing a removable insert at an interior wall of a lamp housing of a vehicle lamp assembly. The removable insert includes a customized feature that is visible through a window formed in a front exterior surface of the vehicle lamp housing.

In a further non-limiting embodiment of the foregoing methods, the method includes removing an access panel from the lamp housing to expose an access opening, and removing the removable insert through the access opening.

In a further non-limiting embodiment of either of the foregoing methods, the method includes inserting a second removable insert through the access opening, and securing the second removable insert at the interior wall. The second removable insert includes a second customized feature that is different from the customized feature.

In a further non-limiting embodiment of any of the foregoing methods, the method includes backlighting the customized feature of the removable insert.

In a further non-limiting embodiment of any of the foregoing methods, the customized features includes a brand name, initials, a logo or symbol, or a phrase.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to vehicle exterior lighting systems that include lamp assemblies that may be customized for meeting customer styling preferences. Exemplary lamp assemblies may include a lamp housing, a removable insert mounted to an interior wall of the lamp housing, and an access panel mounted to the rear exterior surface. The access panel is removable from the rear exterior surface to expose an access opening for inserting or removing the removable insert. The removable insert may include one or more customized features for personalizing the lamp assemblies. These and other features of this disclosure are described in greater detail in the following paragraphs of this detailed description.

Figure 1:
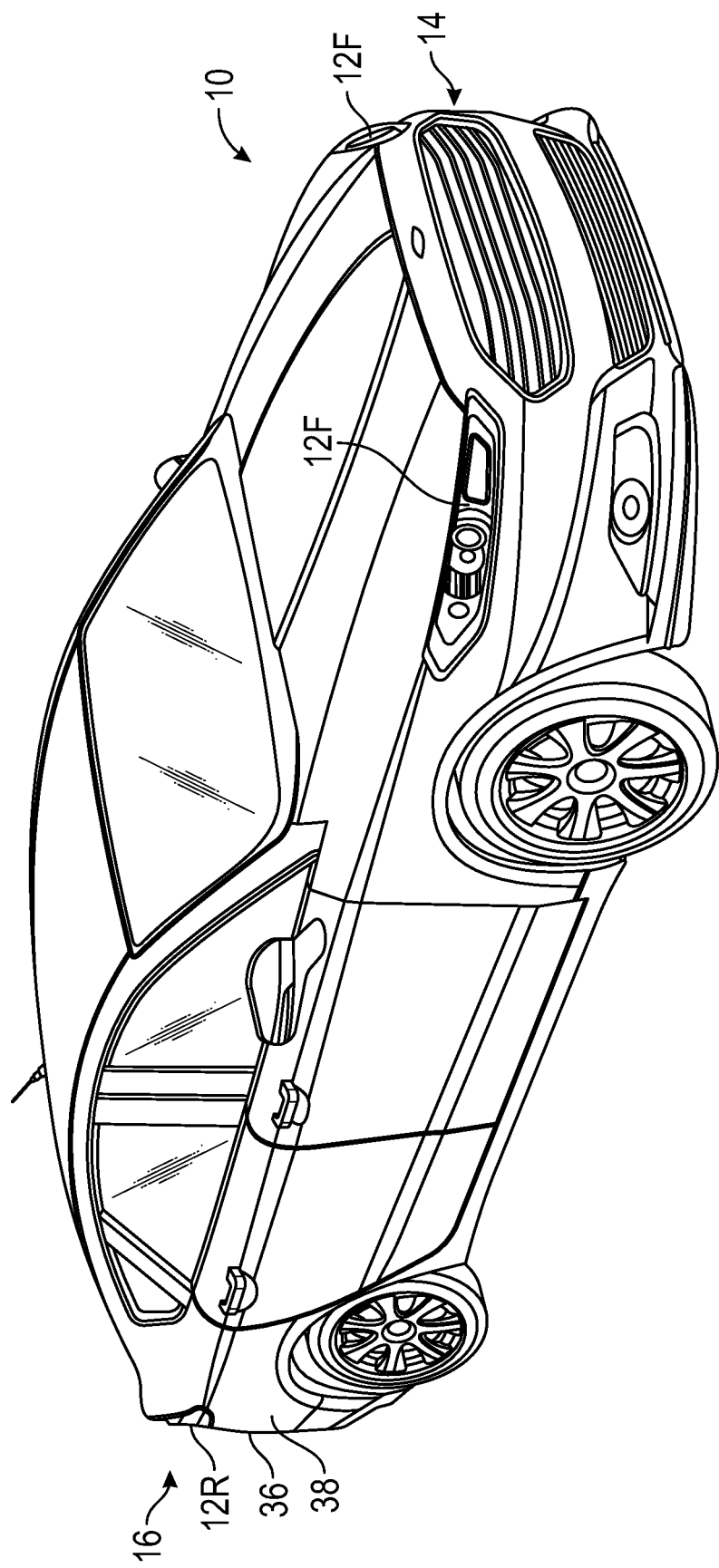
FIG. 1 schematically illustrates a vehicle equipped with multiple lamp assemblies.

FIG. 1 schematically illustrates a vehicle 10. In an embodiment, the vehicle 10 is configured as a car. However, the vehicle 10 could alternatively be configured as a pickup truck, a van, a sport utility vehicle, or any other type of vehicle within the scope of this disclosure. The vehicle 10 could also be a conventional motor vehicle, a battery powered hybrid or electric vehicle, or an autonomous vehicle (i.e., a driverless vehicle).

Although a specific component relationship is illustrated in the figures of this disclosure, the illustrations are not intended to limit this disclosure. In other words, the placement and orientation of the various components of the vehicle 10 are shown schematically and could vary within the scope of this disclosure. In addition, the various figures accompanying this disclosure are not necessarily to scale, and some features may be exaggerated or minimized to emphasize certain details of a particular component.

The vehicle 10 may be equipped with one or more lamp assemblies 12F located near a front portion 14 of the vehicle 10 and one or more lamp assemblies 12R located near a rear portion 16 of the vehicle 10. The lamp assemblies 12F may be referred to as head lamp assemblies of the vehicle 10, and the lamp assemblies 12R may be referred to as tail lamp assemblies of the vehicle 10. In an embodiment, the vehicle 10 is equipped with a pair of lamp assemblies 12F and a pair of lamp assemblies 12R for a total of four lamp assemblies. However, multiple lamp assemblies may be positioned throughout the exterior of the vehicle 10, and thus the total number of lamp assemblies 12F, 12R is not intended to limit this disclosure.

Each lamp assembly 12F, 12R may include a multitude of lamps and signaling devices for providing exterior vehicle lighting and for alerting other drivers and/or pedestrians to the vehicle's presence and to the driving intentions of the vehicle 10. Together, the lamp assemblies 12F, 12R establish an exterior lighting system of the vehicle 10 for producing various lighting functions, including but not limited to, high and low beam lighting, turn lights, fog lights, daytime running lights, etc. For the purposes of this disclosure, the lamp assemblies 12F, 12R may be collectively referred to hereinafter by the reference numeral '12'.

Vehicle customers may desire to customize the vehicle 10 to suit their individual styling preferences. As further detailed below, the lamp assemblies 12 may include removable inserts for providing customized features within the lamp assemblies 12. The customized features provide an element of personalization to the lamp assemblies 12 that is not generally available in existing vehicle lamp assemblies.

Figure 2:
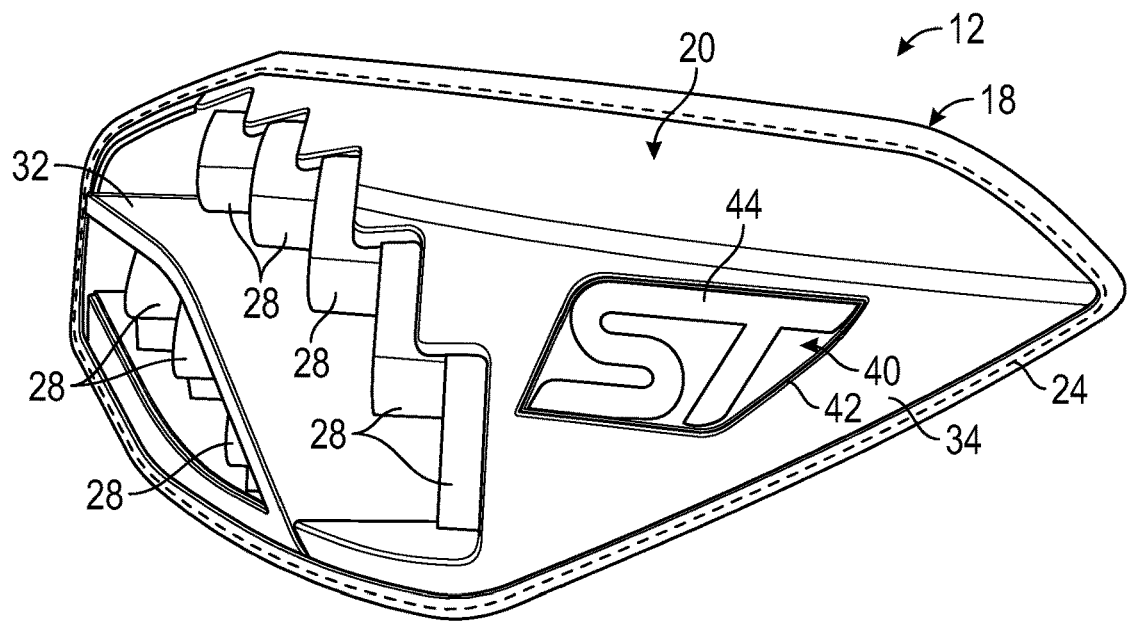
FIG. 2 illustrates a front exterior surface of a lamp housing of an exemplary lamp assembly.
Figure 3:
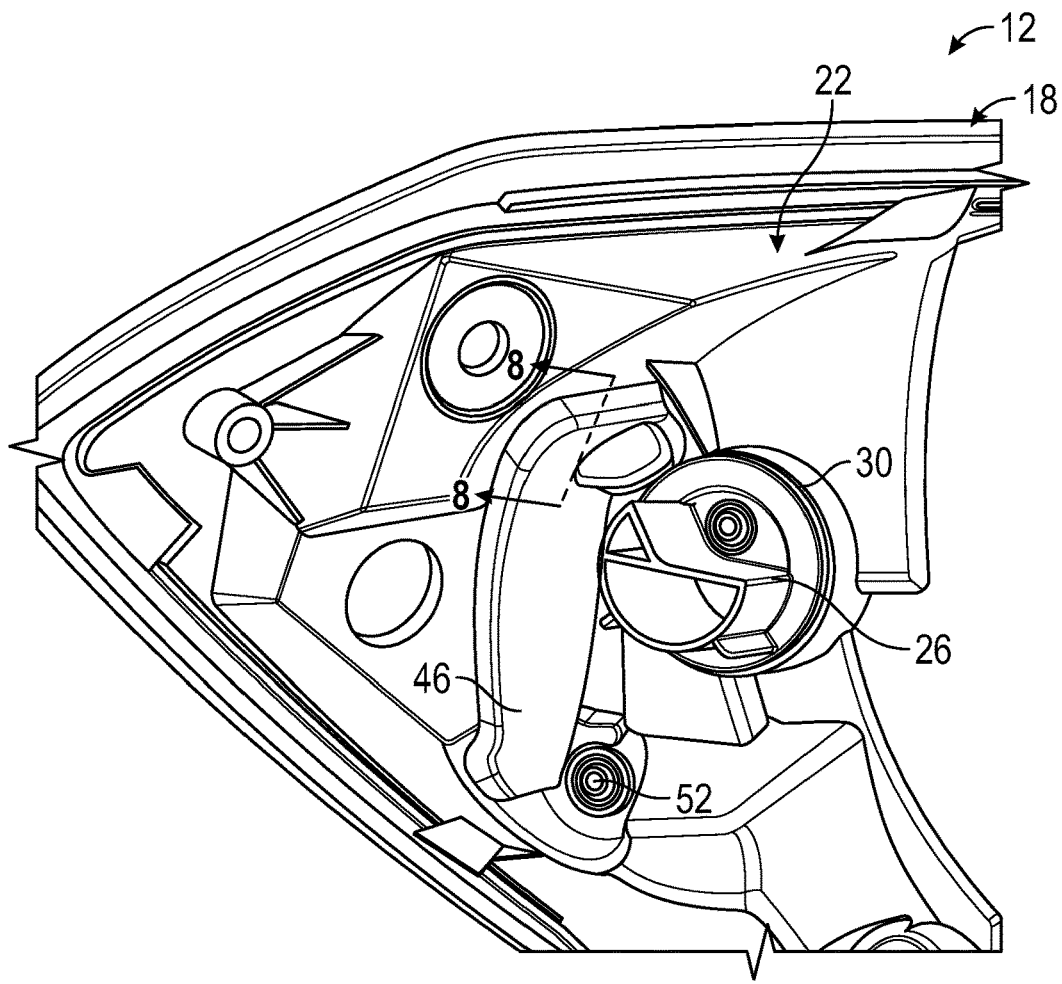
FIG. 3 illustrates a rear exterior surface of the lamp housing of the lamp assembly of FIG. 2.
Figure 4:
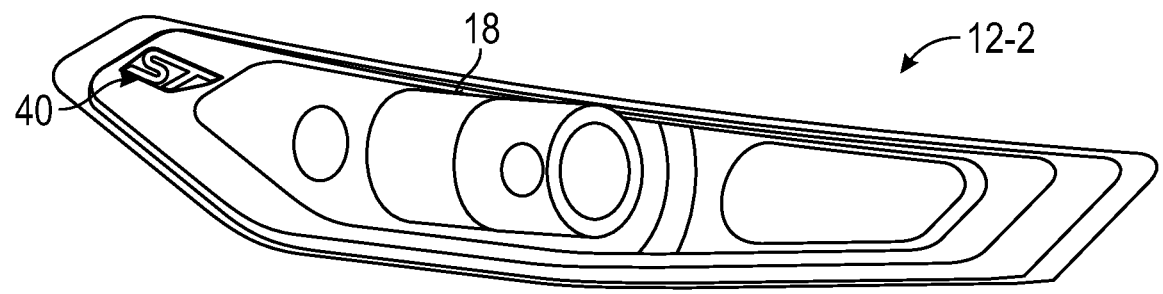
FIG. 4 illustrates another exemplary lamp assembly.

FIGS. 2 and 3 illustrate an exemplary lamp assembly 12 for a vehicle, such as the vehicle 10 of FIG. 1 or any other vehicle. In the illustrated embodiment of FIGS. 2-3, the lamp assembly 12 is configured as a tail lamp assembly. However, the teachings of this disclosure are also applicable to head lamp assemblies (see, e.g., the lamp assembly 12-2 of FIG. 4).

The lamp assembly 12 may include a lamp housing 18 having a front exterior surface 20 (see FIG. 2) and a rear exterior surface 22 (see FIG. 3). A lens 24 may be connected to the lamp housing 18 and generally covers the front exterior surface 20. The lens 24 is shown schematically using phantom lines in FIG. 2 in order to better illustrate select features associated with the front exterior surface 20 of the lamp housing 18. The lens 24 may be clear or translucent for permitting light to escape from the lamp assembly 12 to the outside environment. The lamp housing 18 and the lens 24 may be sized and shaped to provide an aerodynamic and aesthetically pleasing design. The size, shape, and overall configuration of the lamp housing 18 and the lens 24 are not intended to limit this disclosure.

A light source 26 (see FIG. 3) may be positioned within the lamp housing 18 and is configured for emitting light through a plurality of lit features 28 of the lamp housing 18 prior to escaping through the lens 24 for producing various lighting functions. In an embodiment, the light source 26 is inserted through an opening 30 formed through the rear exterior surface 22 of the lamp housing 18. Although a single light source 26 is depicted in FIG. 3, it should be understood that the lamp assembly 12 could include a multitude of light sources. The light source 26 may be an incandescent bulb, a halogen bulb, or a light emitting diode (LED), for example. However, other light sources could also be utilized within the scope of this disclosure. The light source 26 may be positioned at least partially inside the lamp housing 18 and is configured for directing light through the lens 24. The light source 26 may be powered by a vehicle power supply system and may be controlled by a vehicle lighting control module, for example. Although not specifically shown in FIGS. 2 and 3, the lamp assembly 12 could include features such as reflectors, bezels, etc. for reflecting light, reducing glare, providing decorate surfaces, etc.

The front exterior surface 20 of the lamp housing 18 may include a rear facing portion 32 and a side facing portion 34. The rear facing portion 32 generally faces in a direction away from the rear end 36 (see FIG. 1) of the vehicle 10. The side facing portion 34 generally faces in a direction away from a side 38 (see FIG. 1) of the vehicle 10.

Figure 5:
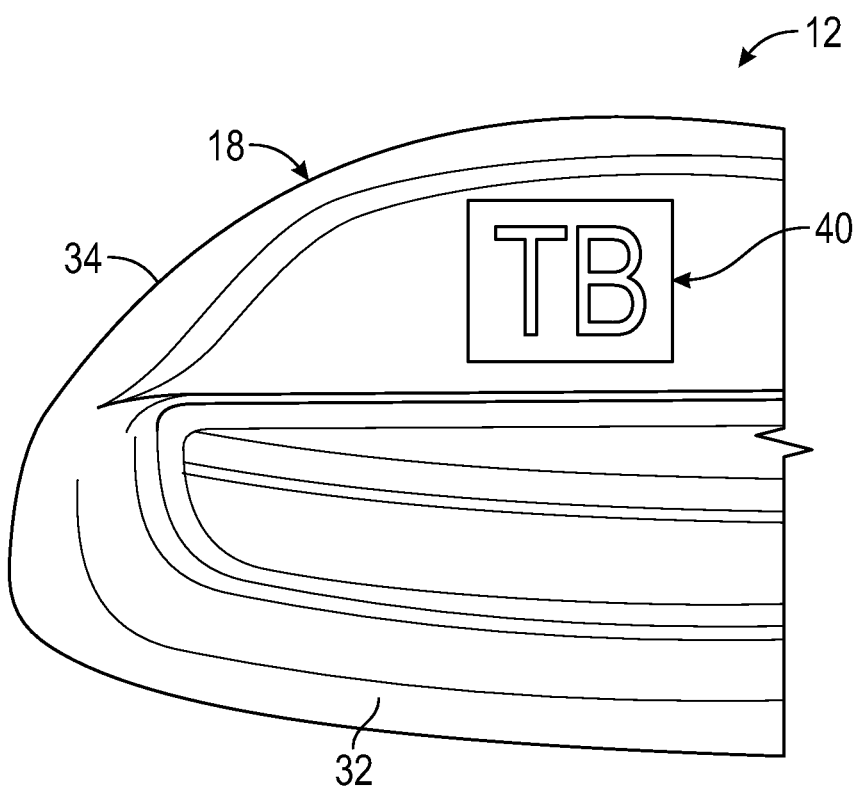
FIG. 5 illustrates another exemplary lamp assembly.

One or more removable inserts 40 may be secured to the lamp housing 18 for providing customized features to the lamp assembly 12. Each removable insert 40 may be secured in place relative to a window 42 formed in the front exterior surface 20 of the lamp housing 18. The removable insert 40 may be positioned at the side facing portion 34 of the front exterior surface 20 (see, e.g., FIG. 2), at the rear facing portion 32 of the front exterior surface 20 (see, e.g., FIG. 5), or both. The size, shape, color and overall configuration of the removable insert 40 are not intended to limit this disclosure.

Figure 6A:
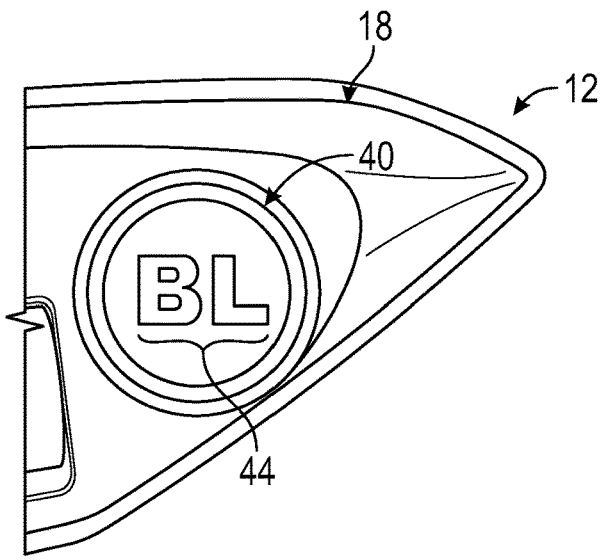
FIGS. 6A, 6B, and 6C illustrate exemplary customized features that can be provided by a removable insert of a vehicle lamp assembly.

The removable insert 40 may include a customized feature 44 that is visible through the window 42. The customized feature 44 could include any feature that allows a customer (i.e., the owner of the vehicle 10), a dealer, or even the vehicle manufacture to customize or personalize the lamp assembly 12. For example, the customized feature 44 may include a brand name (see, e.g., FIG. 2), a customer's initials (see, e.g., FIG. 6A), a logo or symbol (see, e.g., FIG.

Figure 6B:
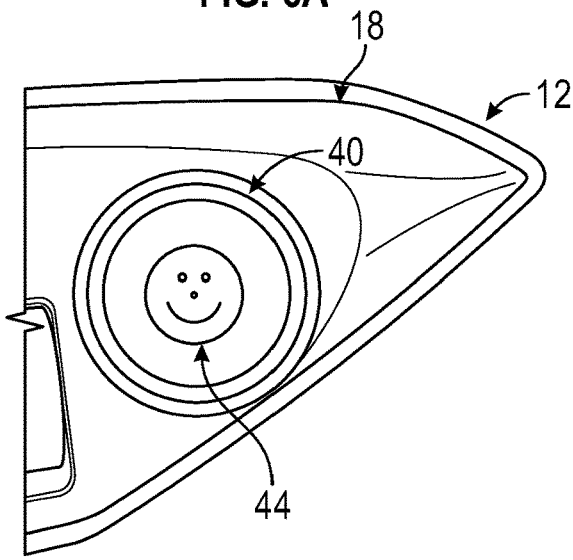
Figure 6C:
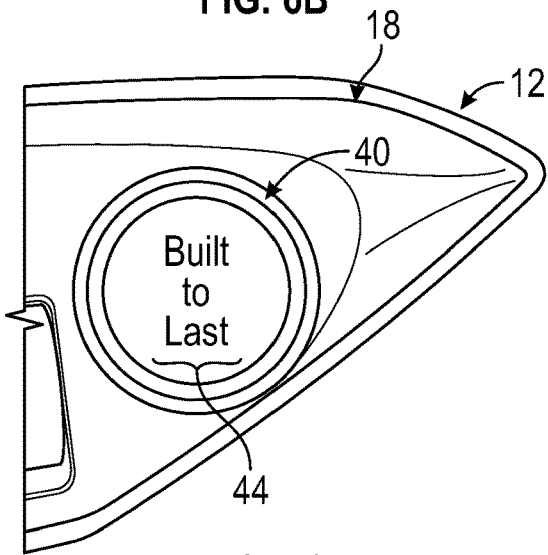

6B), a phrase (see, e.g., FIG. 6C), etc. Some customized features 44 may be embodied by letters or symbols alone (see, e.g., FIG. 5). However, other customized features 44 may include letters or symbols accompanied by one or more geometric shapes (i.e., circle, oval, square, etc.) (see, e.g., FIGS. 6A-6C).

Figure 7:
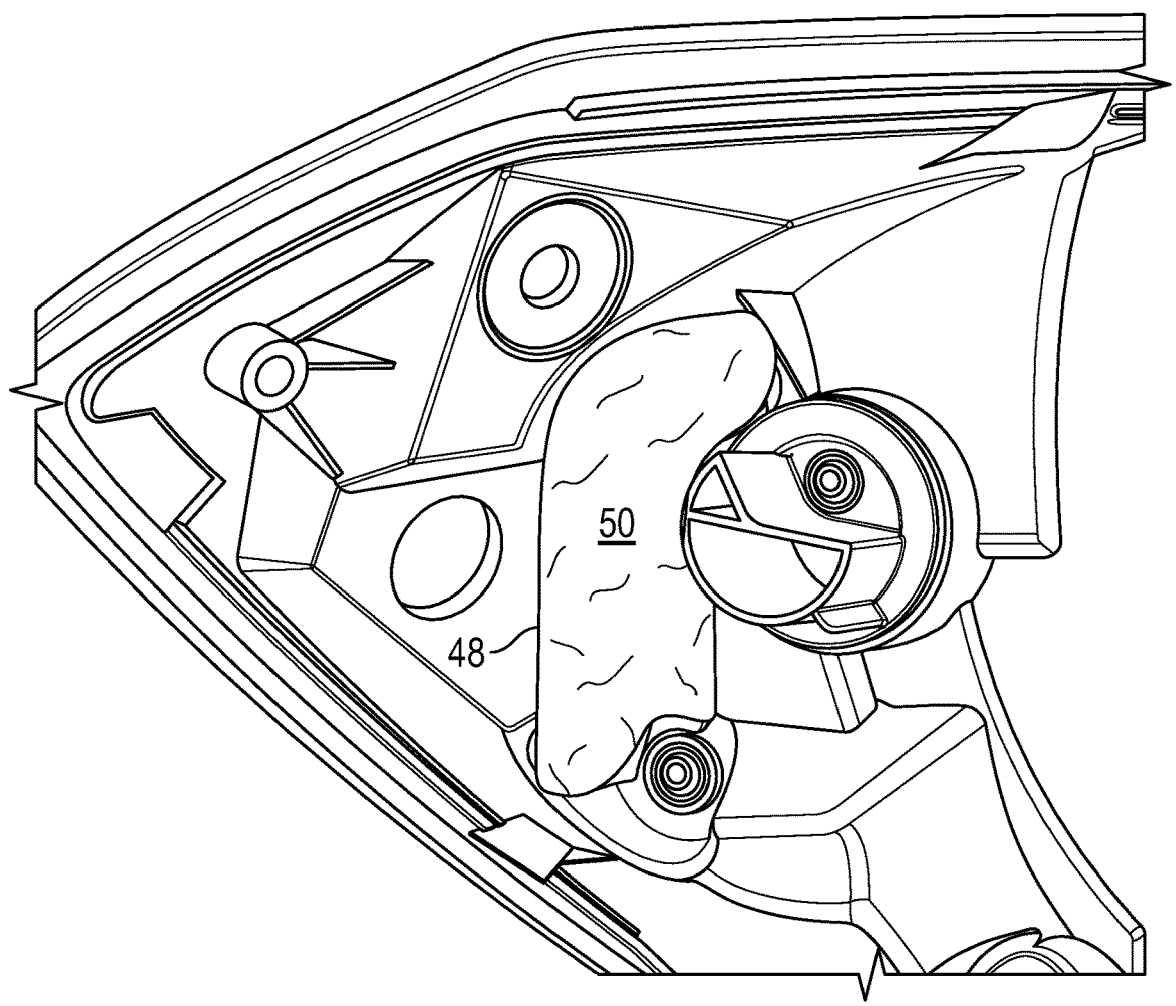
FIG. 7 illustrates the rear exterior surface of the lamp housing of FIG. 3. An access panel is removed to expose an access opening of the lamp assembly.

Any of the removable inserts 40 described herein may be removed from the lamp housing 18 and replaced with another removable insert having a different customized feature. For example, referring to FIGS. 3, 7, and 8, an access panel 46 may be removably mounted to the rear exterior surface 22 of the lamp housing 18. The access panel 46 may be removed from the rear exterior surface 22 to expose an access opening 48 (see FIG. 7). The access opening 48 provides access to an interior 50 of the lamp housing 18. Once exposed, the access opening 48 can be utilized to either position the removable insert 40 within the interior 50 of the lamp housing 18 or remove the removable insert 40 from the interior 50, such as for replacing the removable insert 40 with a second removable insert that provides a second, different customized feature, for example.

In an embodiment, the access panel 46 is mounted to the rear exterior surface 22 of the lamp housing 18 by one or more fasteners 52, such a screws. In another embodiment, the access panel 46 is received within and secured relative to the access opening 48 via an interference fit (see, e.g., FIGS. 9-10).

Figure 8:
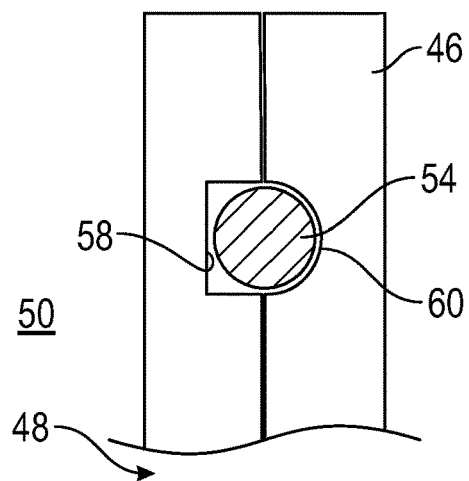
FIG. 8 is a cross-sectional view through section 8-8 of FIG. 3.

As best shown in FIG. 8, a gasket seal 54 may be utilized to seal the interface between the access panel 46 and the access opening 48, thereby substantially preventing dust and moisture ingress into the interior 50. The gasket seal 54 may be sandwiched between a first mating surface 56 of the access panel 46 and a second mating surface 58 of the portion of the lamp housing 18 that circumscribes the access opening 48. In an embodiment, the gasket seal 54 is received within a groove 60 formed in first mating surface 56 of the access panel 46.

Figure 9:
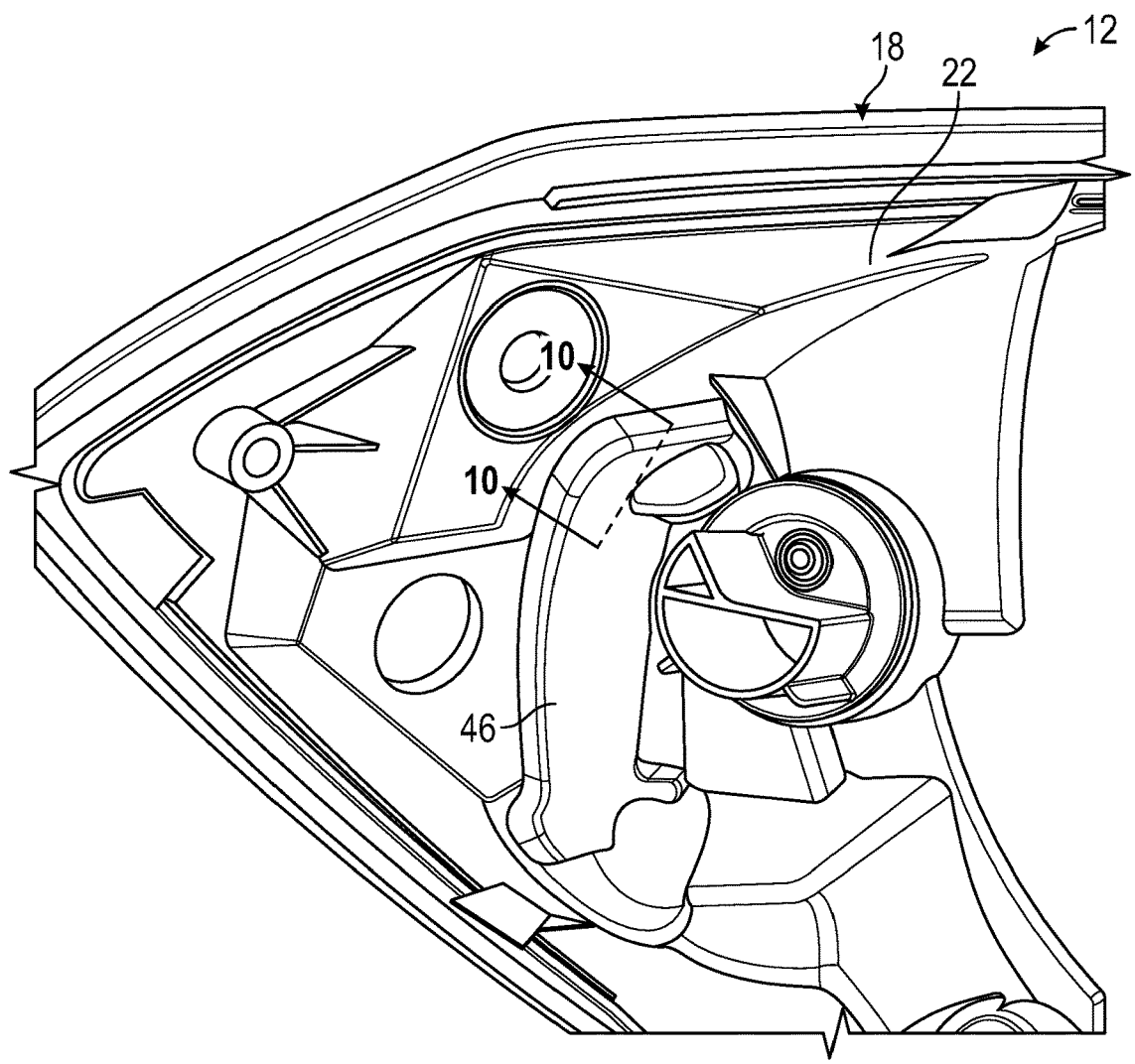
FIG. 9 illustrates another exemplary access panel of a lamp assembly.
Figure 10:
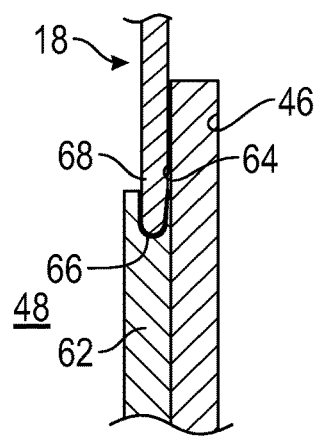
FIG. 10 is a cross-sectional view through section 10-10 of FIG. 9.

In an alternative embodiment, shown in FIGS. 9-10, the access panel 46 may include a grommet 62 that protrudes from an interior surface 64 of the access panel 46. The grommet 62 may be an integral component of the access panel 46 and may be made of rubber or other suitable elastomeric materials.

The grommet 62 may include a groove 66. A wall portion 68 of the lamp housing 18 that circumscribes the access opening 48 may be received within the groove 66 as the grommet 62 of the access panel 46 is pushed into the access opening 48. The grommet 62 therefore serves to both attach the access panel 46 to the lamp housing 18 via an interference fit and to seal an interface between the access opening 48 and the access panel 46.

Figure 11:
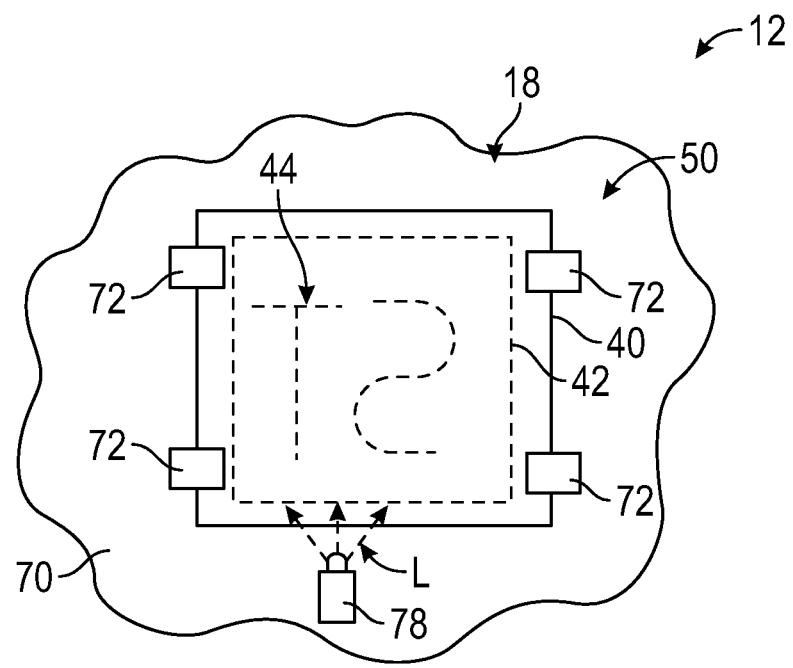
FIG. 11 illustrates an interior of the lamp assembly of FIGS. 2 and 3.

FIG. 11, with continued reference to FIGS. 2 and 3, schematically illustrates select portions of the interior 50 of the lamp housing 18 of the lamp assembly 12. The removable insert 40 may be secured relative to an interior wall 70 of the lamp housing 18 in order to position the removable insert 40 within the window 42 of the front exterior surface 20. Access to the interior wall 70 may be obtained through the access opening 48 after removing the access panel 46.

Figure 12:
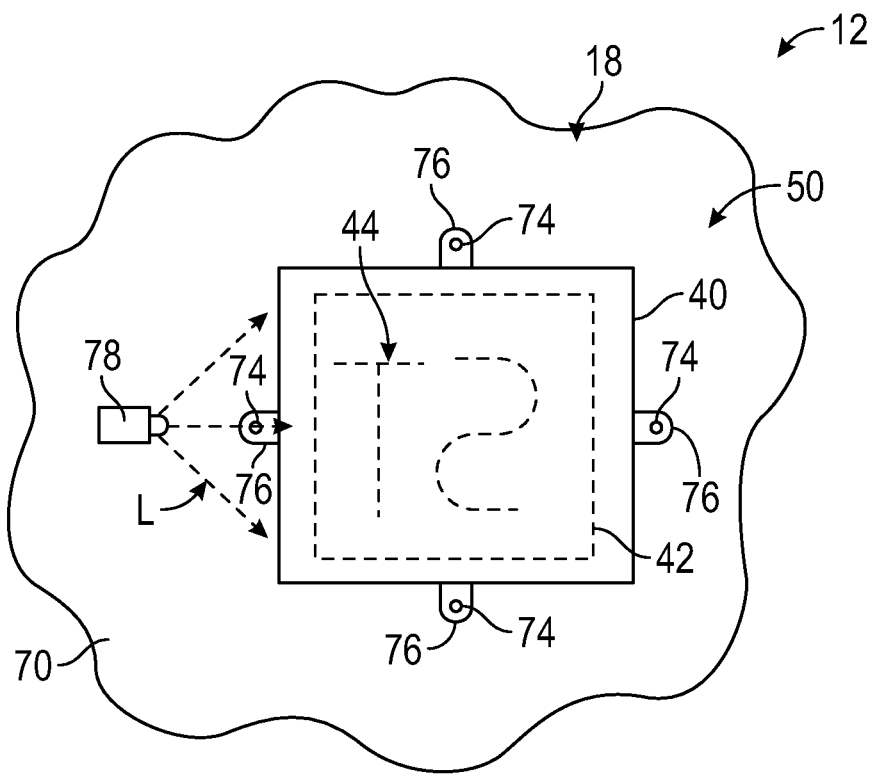
FIG. 12 illustrates an interior of another exemplary lamp assembly.

One or more retention clips 72 may protrude from the interior wall 70. The removable insert 40 may be held in place relative to the window 42 by the retention clips 72. In an embodiment, the retention clips 72 are flexible such that the removable insert 40 may be snapped into place. In another embodiment, the removable insert 40 is mounted in place relative to the window 42 by one or more fasteners 74 (e.g., screws) that can be inserted through a mounting tab 76 of the removable insert 40 and then into the interior wall 70 (see FIG. 12). The total number of mounting tabs 76 and fasteners 74 used to mount the removable insert 40 into place are not intended to limit this disclosure.

The customized feature 44 of the removable insert 40 may be a lit feature. For example, one or more light sources 78 may be mounted to the interior wall 70. The light sources 78 may be controlled to emit light L in order to illuminate the customized feature 44 from inside the interior 50. The removable insert 40 may be at least partially translucent for allowing the light L from the light source(s) 78 to pass through the customized feature 44, thereby creating a backlit appearance. The light sources 78 are separate light sources from the light sources 26, in an embodiment.

The vehicle exterior lighting systems of this disclosure incorporate lamp assemblies that may be personalized with removable inserts for meeting customer styling preferences. The inserts are removable and interchangeable with other inserts for creating a near endless amount of customization options for vehicle customers without interfering with the overall functionality of the vehicle lamps.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle lamp assembly, comprising:
    a lamp housing including a front exterior surface and a rear exterior surface;
    a removable insert mounted at an interior wall of the lamp housing; and
    an access panel mounted to the rear exterior surface,
    wherein the access panel is removable from the rear exterior surface to expose an access opening for accessing the removable insert,
    wherein the vehicle lamp assembly is a head lamp assembly or a tail lamp assembly configured to produce at least one of a high beam light, a low beam light, or a turn light,
    a first light source mounted to the rear exterior surface and configured for illuminating portions of the lamp housing; and
    a second light source mounted directly to the interior wall of the lamp housing and configured for illuminating the removable insert.

2. The vehicle lamp assembly as recited in claim 1, comprising a lens supported by the lamp housing.

3. The vehicle lamp assembly as recited in claim 1, wherein the first light source is configured to produce the high beam light, the low beam light, or the turn light and the second light source is configured to backlight a customized feature of the removable insert.

4. The vehicle lamp assembly as recited in claim 1, wherein the removable insert includes a customized feature, wherein the customized feature includes a brand name, initials, a logo or symbol, or a phrase.

5. The vehicle lamp assembly as recited in claim 1, wherein the removable insert is viewable through a window formed in the front exterior surface.

6. The vehicle lamp assembly as recited in claim 1, wherein the removable insert is clipped or fastened to the interior wall.

7. The vehicle lamp assembly as recited in claim 1, wherein the access panel is mounted to the rear exterior surface by at least one screw.

8. The vehicle lamp assembly as recited in claim 1, wherein the access panel is received within the access opening in an interference fit.

9. The vehicle lamp assembly as recited in claim 1, wherein an interface between the access panel and the access opening is sealed via a gasket seal or a grommet.

10. The vehicle lamp assembly as recited in claim 1, wherein the removable insert is secured to a side facing portion of the front exterior surface.

11. A vehicle comprising the vehicle lamp assembly of claim 1.

12. The vehicle as recited in claim 11, comprising a second vehicle lamp assembly including:
a second lamp housing;
a second removable insert secured to an interior wall of the second lamp housing.

13. A method, comprising:
securing a removable insert at an interior wall of a lamp housing of a vehicle lamp assembly,
wherein the removable insert includes a customized feature that is visible through a window formed in a front exterior surface of the vehicle lamp housing,
wherein the lamp housing and the removable insert are illuminated by different light sources of the vehicle lamp assembly.

14. The method as recited in claim 13, comprising:
removing an access panel from the lamp housing to expose an access opening; and
removing the removable insert through the access opening.

15. The method as recited in claim 14, comprising:
inserting a second removable insert through the access opening;
securing the second removable insert at the interior wall,
wherein the second removable insert includes a second customized feature that is different from the customized feature.

16. The method as recited in claim 13, comprising:
backlighting the customized feature of the removable insert.

17. The method as recited in claim 13, wherein the customized features includes a brand name, initials, a logo or symbol, or a phrase.

18. A vehicle lamp assembly, comprising:
a lamp housing including a front exterior surface and a rear exterior surface,
wherein the front exterior surface includes a first portion that faces in a direction away from a front or rear of a vehicle that includes the vehicle lamp assembly and a second portion that faces in a direction away from a side of the vehicle;
a removable insert positioned within a window formed in either the first portion or the second portion of the front exterior surface,
wherein the removable insert is mounted at an interior wall of the lamp housing;
an access panel mounted to the rear exterior surface,
wherein the access panel is removable from the rear exterior surface to expose an access opening for accessing the removable insert,
wherein the vehicle lamp assembly is a head lamp assembly or a tail lamp assembly configured to produce at least one lighting function for indicating a presence or driving intention of the vehicle;
a first light source mounted to the rear exterior surface and configured for illuminating portions of the lamp housing; and
a second light source mounted directly to the interior wall of the lamp housing and configured for illuminating the removable insert.

19. The vehicle lamp assembly as recited in claim 18, wherein the first light source is accessible through a second access opening formed in the rear exterior surface, wherein the second access opening is a different opening from the access opening.

20. The vehicle lamp assembly as recited in claim 18, wherein the second light source is offset from the removable insert along the interior wall and is configured to illuminate the removable insert from below or from a side of the removable insert.

* * * * *